July 28, 1959     S. VORECH     2,897,010
FLUID PRESSURE BRAKING SYSTEM FOR TRACTOR-TRAILER VEHICLES
Filed Sept. 21, 1955
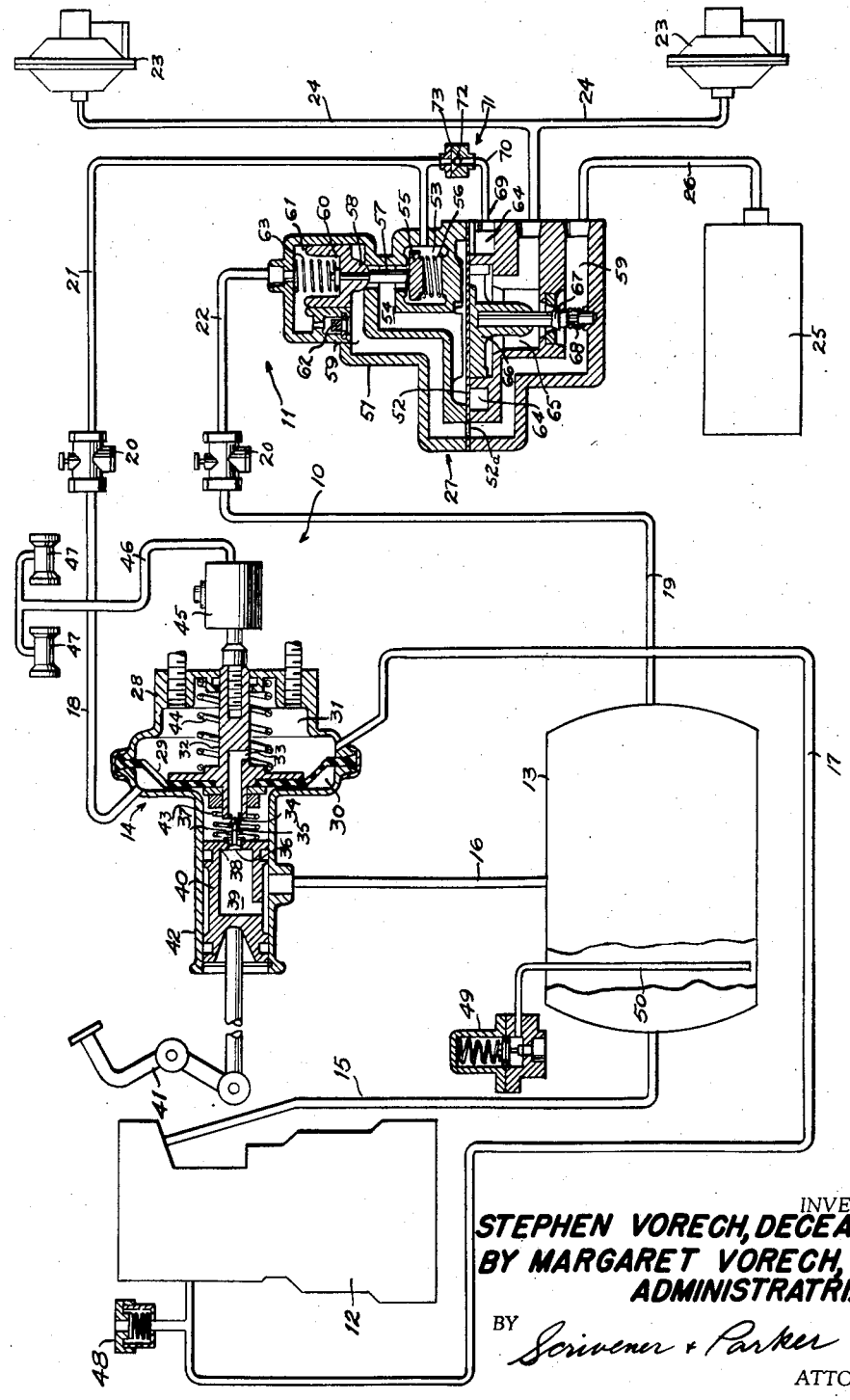
INVENTOR
STEPHEN VORECH, DECEASED
BY MARGARET VORECH,
ADMINISTRATRIX
BY Scrivener + Parker
ATTORNEYS

United States Patent Office 2,897,010
Patented July 28, 1959

2,897,010

FLUID PRESSURE BRAKING SYSTEM FOR TRACTOR-TRAILER VEHICLES

Stephen Vorech, deceased, late of Elyria, Ohio, by Margaret Vorech, administratrix, Elyria, Ohio, assignor to Bendix-Westinghouse Automotive Air Brake Company, Elyria, Ohio, a corporation of Delaware Application September 21, 1955, Serial No. 535,589

2 Claims. (Cl. 303—10)

This invention relates to closed fluid pressure systems and more particularly to a closed fluid pressure system for automotive tractor-trailer combinations wherein the fluid after being utilized to perform work on the tractor and on the trailer is recirculated and is not exhausted to atmosphere.

The present invention is an extension of the system shown and described in the application of Ellery R. Fitch and James V. Ralston for "Fluid Pressure System," Serial No. 340,342, filed March 4, 1953, now Patent No. 2,746,255, dated May 22, 1956. In that application the closed system includes a continuously operating compressor whose output is limited to a predetermined pressure by adjustment of a clearance volume control. The compressor output is delivered to a reservoir which is connected to a motor having a pressure chamber and an exhaust chamber with a connection therebetween which includes a valve. The valve in one position closes the connection between the chambers and opens the connection between the reservoir and pressure chamber to energize the motor. The valve in a second position performs the reverse operation, opening the pressure chamber to the exhaust chamber from whence the energizing fluid flows by way of a connection directly into the inlet side of the compressor which in turn delivers the fluid to the reservoir to complete the cycle.

The system of the application is illustrated as used in connection with an automotive braking system and the closed system is particularly suitable for such use since it eliminates the necessity for using complicated and expensive control devices for the compressor and reservoirs as utilized in prior systems, which devices rendered such prior systems particularly unsuitable for use in relatively light-weight automotive vehicles.

A principal object of the present invention is to provide a novel automotive tractor-trailer combination which embodies the features of the above application.

A more specific object of the invention is to provide a closed system for a tractor-trailer combination wherein the fluid which in previous systems had been exhausted to atmosphere upon the completion of work performance is, instead on both tractor and trailer recirculated without being exhausted to atmosphere.

A still further object of the invention is to provide a simple and efficient compressed air system for tractor-trailer combinations which system is particularly adapted for brake control and/or application on a tractor-trailer combination equipped with hydraulic brakes on the tractor and air brakes on the trailer, the system including novel means for recirculating through the system the air utilized for controlling and applying the brakes upon the completion of a brake application.

Yet another object of the invention is to provide in a fluid pressure trailer braking system of a tractor-trailer combination a closed system wherein both the pressure fluid utilized for controlling the brakes as well as the pressure fluid utilized for applying the brakes is recirculated without being exhausted to atmosphere.

Other objects and novel features of the invention will appear more fully hereinafter from a consideration of the following description when taken in connection with the accompanying drawing. It will be expressly understood, however, that the drawing is utilized for purposes of illustration only, and is not to be taken as a definition of the limits of the invention, reference being had for this purpose to the appended claims.

In the drawing, the invention is illustrated diagrammatically, certain parts thereof being shown in section.

Referring more particularly to the drawing there is illustrated the application of the present invention to the braking system of a tractor-trailer combination. In the drawing the numeral 10 refers to that portion of the closed system of the invention carried by the tractor and the numeral 11 refers to the portion carried by the trailer. The tractor portion 10 includes a compressor 12, a tractor reservoir 13, and a valve controlled motor 14, these elements being interconnected by conduits 15, 16 and 17. In addition, a service conduit 18 is connected to the motor 14 and an emergency conduit 19 is connected to the tractor reservoir 13. Conduits 18 and 19 lead to the rear of the tractor for connection through conventional cut-off cocks 20 with corresponding trailer conduits 21 and 22. In addition to these, the trailer portion 11 of the closed system includes brake chambers or actuators 23, conduits 24, a trailer reservoir 25, and a trailer reservoir conduit 26, all of which, with the trailer service and emergency conduits 21, 22, are interconnected through a relay-emergency valve 27 referred to with particularity hereinafter.

The portion 10 of the system carried on the tractor, less service and emergency conduits 18, 19, is described in detail in the above referred to pending application. As explained in said application, the compressor 12 is preferably of the continuously operating reciprocating piston type whose output is determined by adjustment of a clearance volume control. That is to say, when the compressor has loaded the system to a predetermined pressure above atmospheric, the compressor does not unload but continued operation thereof delivers no additional pressure to the system due to the adjustment of the clearance volume. As the compressor operates it delivers fluid by way of conduit 15 to the tractor reservoir 13 from whence it flows by way of conduit 16 to the motor 14 and by way of tractor-trailer emergency conduits 19, 22, to the relay-emergency valve 27 through which the fluid passes as hereinafter described to charge the trailer reservoir 25.

The motor 14 is described in detail in the aforementioned application and briefly comprises a motor housing 28 whose interior is divided by a diaphragm 29 into pressure and exhaust chambers 30, 31, each of which is respectively connected to the service conduit 18 leading to the trailer, and to the conduit 17 which serves as an exhaust conduit leading directly to the inlet of the compressor 12. The diaphragm 29 has connected centrally thereto a combined pressure plate and actuator rod 32 of which the latter extends outwardly of the housing 28 through the exhaust chamber 31 which in turn is connected to the pressure chamber 30 by a passage 33. The end of the passage 33 on the pressure side of diaphragm 29 forms a valve seat engageable by a normally open exhaust valve 34 connected by a stem 35 with an inlet valve 36 normally urged by a spring 37 into seating engagement with a valve seat 38 at one end of a chamber 39 in a plunger 40, which latter is slidable under the control of a manually operated device, such as the pedal 41 shown, in a casing 42 formed as an extension of housing 28. The plunger 40 and diaphragm 29 are normally urged to the position shown by return springs 43, 44 respectively.

As explained in the aforementioned application, to which reference is again made for a detailed explanation, the plunger chamber 39 is at all times exposed by conduit 16 to the pressure in the tractor reservoir 13 so that when plunger 40 is advanced to the right by depression of pedal 41 it travels until the exhaust valve 34 seats on the end of passage 33 to close the same, whereafter continued movement of plunger 40 unseats inlet valve 36 to admit fluid pressure to pressure chamber 30. Upon this occurrence pressure fluid flows through service conduits 18, 21, to the relay valve 27 on the trailer while simultaneously fluid pressure acts on diaphragm 29 to move it and the attached pressure plate and actuator rod 32 to the right where the latter may, if desired, operate a master cylinder 45 of a hydraulic brake system on the tractor which may include the hydraulic conduits and brake cylinders or actuators 46, 47, shown. When further movement of the plunger 40 is arrested in an advanced position, the diaphragm 29 continues moving to the right under the influence of fluid pressure until the inlet valve 36 reseats thus cutting off the admission of additional fluid pressure to chamber 30, at which point the valve mechanism becomes balanced or lapped and further movement of the diaphragm and actuator rod is arrested.

To exhaust the pressure chamber 30 and the service conduits 18, 21 the pedal 41 is released whereupon plunger return spring 43 moves the plunger 40 and valves 34 and 36 to the left, withdrawing the former from its seated position at the pressure end of passage 33 thereby connecting pressure and exhaust chambers 30 and 31 so that pressure fluid in the former flows through passage 33 into the latter and thence to the inlet side of the compressor 12 via exhaust conduit 17. When the pressure is thus released, diaphragm return spring 44 moves the diaphragm to the left to a new lapped position or to the full release position of the drawing. As the fluid pressure is exhausted from the pressure chamber 30, the pressure fluid simultaneously exhausted from the service lines 18, 21 will effect brake release on the trailer in a manner to be later described.

Two additional elements are incorporated in the portion of the closed system carried by the tractor and these comprise a normally closed inlet check valve 48 connecting the exhaust conduit 17 with atmosphere on the inlet side of compressor 12 and a normally closed combined safety-drain valve 49 for connecting the pressure reservoir 13 with atmosphere when a predetermined high pressure therein is exceeded. For a detailed description of the valves 48 and 49 reference is hereby made to the aforementioned pending application. However, the inlet check valve 48 serves to admit air to the compressor during initial charging of the system and also serves as a replenishing valve to make up leakage losses. The safety-drain valve 49 is communicated with the bottom of reservoir 13 by the elongated pipe 50 shown and is set to open at a predetermined pressure in the system. As clearly explained in the pending application, exhausting of pressure from motor 14 to the inlet side of the compressor 12 momentarily supercharges the latter so that, unless the pressure in reservoir 13 has fallen to an appreciably low value, an excess of pressure over the predetermined lifting pressure of valve 49 is delivered to the reservoir 13 causing valve 49 to lift to discharge the excess pressure and with it, through pipe 50, any moisture which may have collected in the bottom of the tank 13. Thus the closed system is automatically self-draining.

Referring now to the trailer section of the closed system, this portion, apart from its connection with the tractor portion and apart from the modifications enabling fluid pressure to be recirculated rather than be exhausted to atmosphere as will become more fully apparent, may be essentially similar to trailer systems used heretofore of the type wherein service pressure acts on the diaphragm of a relay valve to release previously stored pressure from a trailer reservoir to the trailer brake chambers to effect service application of the brakes. The trailer reservoir may be supplied with pressure from the tractor reservoir through an emergency line which includes an emergency valve to effect an emergency application of the brakes in the event of serious leakage loss between the tractor and trailer or in the event of trailer breakaway. All of these features are included in the system of the present invention which differs from the prior art in that, upon trailer brake release, the service pressure acting on the diaphragm of the relay valve and the brake actuating pressure in the brake chambers are exhausted to the inlet side of the compressor on the tractor instead of being exhausted to atmosphere as in the prior art.

The specific trailer system disclosed in the drawing is exemplary only of the type of trailer system described in the foregoing paragraph since it will be apparent that substantially any system which includes a trailer relay valve or a combined relay-emergency valve which heretofore had exhausted service control pressure and brake chamber pressure to atmosphere could be adapted to the closed system of the present invention.

The trailer valve 27 illustrated is a combined relay-emergency valve substantially the same as that shown in the pending application of Stephen Vorech, deceased, by Margaret Vorech, administratrix, Serial Number 499,829, filed April 7, 1955. For a detailed description of said valve reference is hereby made to said application.

The valve comprises a body 51 which includes a single diaphragm 52 serving the dual function of a service valve diaphragm and of an emergency valve diaphragm. Service pressure is admitted to the upper surface of the diaphragm 52 from service line 21 by way of a check valve chamber 53 and an inner passage 54 in the valve body 51. The chamber 53 contains a check valve 55 urged by spring 56 to closed position but normally retained open by a depending rod 57 fixed to a valve 58 controlling communication between the inner passage 54 and an outer passage 59 which latter serves as both a means for conducting charging fluid pressure from the tractor reservoir to the trailer reservoir, through an opening 52a in diaphragm 52, and also as a means for conducting emergency pressure from the trailer reservoir to the upper side of the diaphragm 52. This latter is accomplished by the opening of valve 58 and consequent closing of check valve 55, both of which are controlled by a plunger 60 integral with valve 58 and slidable in a chamber 61 which is connected to emergency conduit 22 and communicated with the passage 59 through a check valve 62. During normal operation, tractor reservoir pressure acting on the upper side of plunger 60 in combination with a spring 63 retains the plunger in its lower position with valve 58 closed and check valve 55 open as shown in the drawing. Meanwhile should there be less pressure in the trailer reservoir 25 than in the tractor reservoir 13, charging fluid from the tractor reservoir flows through the plunger chamber 61 past the check valve 62 and through the passage 59 to the trailer reservoir from which reverse flow to emergency conduit 22 is prevented by check valve 62.

During emergency conditions when there is a marked decrease in the emergency line pressure as would result, for example, from severe leakage loss between the tractor and trailer or from trailer break-away, the pressure in the trailer reservoir, after closing check valve 62 acts on the bottom surface of plunger 60 with sufficient force to overcome any predetermined residual pressure in the plunger chamber 61 and the force of spring 63. Upon this occurrence, plunger 60 rises unseating valve 58 thereby increasing the plunger area upon which the trailer reservoir pressure may act so that plunger 60 then snaps to its full-up position in contact with the upper surface of the chamber 61. As the plunger 60 moves upwardly opening valve 58 the rod 57 is with-drawn from check valve 55 which is then closed by its spring 56 so that trailer reservoir pressure flows from passage 59 to passage 54 and the upper surface of diaphragm 52.

During both emergency and service operation the diaphragm 52 is depressed to effect trailer brake application and, as fully described in the said pending Vorech application, when depressed the diaphragm acts as an exhaust valve and seals an annular exhaust chamber 64 surrounding the upper side of an inlet cavity 65 below the diaphragm 52. As the center of the diaphragm is deflected downwardly a spider-like diaphragm guide 66 and attached inlet or supply valve 67 are forced down opening the latter to allow trailer reservoir pressure in the lower portion of passage 59 to flow past the valve and into the cavity 65 which is connected to the trailer brake actuators 23 by conduits 24. With the valve mechanism in this position, air pressure flows directly from the trailer reservoir through the valve 67 into the brake actuators 23 applying the brakes.

When depressed the diaphragm 52 remains in this position until the pressure on its upper surface is equaled by the pressure on the lower whereupon the force of a supply valve spring 68 lifts the center of the diaphragm to a non-depressed position and closes valve 67 which balances or laps the mechanism to limit the air being delivered to the trailer brakes to the same pressure as that being delivered to the upper surface of the relay valve diaphragm 52. During emergency operation this pressure is, of course, full trailer reservoir pressure but in the case of service operation this pressure is the same as that supplied from the motor 14 on the tractor; that is, the trailer brakes are applied to the same extent as the tractor brakes in accordance with the pressure in the pressure chamber 30 of motor 14 which pressure, as above explained, is a function of the degree of depression of pedal 41 and/or the degree of movement to the right, as viewed in the drawing, of the motor plunger 40.

After an automatic emergency application of the trailer brakes the latter cannot be released except by bleeding the trailer system or by restoring sufficient pressure in the emergency conduit 22 to force plunger 60 downwardly to the position of the drawing thereby closing valve 58 and opening check valve 55 to again connect the pressure on the upper surface of the diaphragm 52 with the service conduits 18, 21.

To release the brakes after a service application, the motor plunger 40 on the tractor is released as previously explained to move to the left in the drawing, to exhaust fluid pressure in chamber 30 to chamber 31 and thence to the inlet side of the compressor 12. As pressure chamber 30 exhausts, pressure in the service lines 18, 21 also exhausts removing pressure from the upper side of trailer relay diaphragm 52 so that pressure in the brake actuators 23 acting on the lower surface of diaphragm 52 raises the latter to allow the air in the brake chambers to exhaust under the outer edge of the diaphragm into the exhaust chamber 64.

As illustrated in the drawing the exhaust chamber 64 is provided with an outlet port 69 to which, in accordance with the invention, a conduit 70 is connected which serves to connect the port 69 through a check valve 71 with the service conduit 21. The check valve 71 is single acting and may be any type such as the ball type shown wherein a ball 72 is seated in a lower position in a valve chamber 73 to prevent the passage of fluid from the service line 21 to the exhaust chamber 64 but is unseated by pressure in the exhaust chamber to permit the fluid therein to flow to the service conduit. Thus, in accordance with the invention, the fluid in the brake chambers which had been derived from the trailer reservoir is exhausted through the relay valve 27, the conduit 70 and check valve 71 to the service conduits 18, 21, thence through the motor 14 and via conduit 17 to the inlet side of the compressor 12 which delivers the fluid to the tractor reservoir 13 from whence fluid flows via emergency conduits 19, 22 to the trailer relay-emergency valve 27 through which it passes to the trailer reservoir 25 to replenish the fluid which had been previously expended therefrom in the service application of the trailer brakes. Thus the closed cycle of the tractor-trailer fluid pressure system of the invention is completed. The use of the check valve 71 in the manner described enables the service conduits 18, 21 to not only supply fluid pressure to the relay-emergency valve 27 but also to conduct exhaust fluid pressure from the trailer actuators 23 back to the compressor inlet. This feature avoids the necessity of having a separate exhaust conduit connecting the tractor and trailer.

It will be clear from the foregoing, that the present invention minimizes the amount of free or atmospheric air being drawn into the system. This not only decreases the amount of foreign solid substances introduced into the system, which are detrimental of the life of the working parts, but also and probably of greater significance, it limits the amount of water vapor in the system to that introduced by the original charging of the system plus that slight amount introduced through the make-up feature of the invention. In addition, the arrangement is such that the fluid exhausted from the brake chambers to the compressor momentarily supercharges the latter. Since the exhaust fluid is relatively higher in pressure than atmospheric air, the ratio of compression of the compressor is decreased which results in lower discharge air temperatures and consequently less carbon formation, as well as an increase in the output capacity of the compressor.

From the above description the operation of the closed system of the invention should be apparent. Obviously, the system is susceptible of many modifications and changes without, however, departing from the scope and spirit of the appended claims.

What is claimed is:

1. A closed system for tractor-trailer vehicle brakes comprising a compressor on the tractor having an inlet, an outlet, and a clearance volume chamber to limit the pressure output of the compressor to a predetermined value above atmospheric pressure, a tractor reservoir connected with said outlet for the storage of compressed air at said predetermined value, a brake motor on the tractor for applying the tractor brakes, a brake actuator on the trailer for applying the trailer brakes, a trailer reservoir, a relay-emergency valve on the trailer having a connection with said actuator, a connection with said tractor reservoir, a connection with said motor and a connection with said trailer reservoir, said relay-emergency valve including an exhaust connection and also including pressure actuated means responsive to an increase in pressure of compressed air in said motor connection to connect the trailer reservoir connection to the actuator connection to energize said actuator to apply the trailer brakes, and responsive to a decrease in pressure of compressed air in said motor connection to connect the actuator connection with the exhaust connection, means including a check valve for conducting compressed air from said exhaust connection to the motor connection only, and means including a first valve for conducting compressed air from the tractor reservoir to the motor and motor connection to respectively apply the tractor brakes and energize said pressure actuated means to apply the trailer brakes, and said means including also a second valve for conducting compressed air from said motor connection and motor to the compressor inlet to release the tractor and trailer brakes.

2. A closed fluid pressure braking system for tractor-trailer vehicle brakes comprising a compressor on the tractor having an inlet, an outlet, and a clearance volume chamber to limit the pressure output of the compressor to a predetermined value above atmospheric pressure, a tractor reservoir connected with said outlet for the storage of compressed air at said predetermined value, a brake motor on the tractor for applying the tractor brakes, a brake actuator on the trailer for applying the trailer brakes, a trailer reservoir connected with said tractor reservoir for the storage of compressed air on the trailer at said predetermined value, means operable to connect the tractor reservoir with the brake motor and for connecting the trailer reservoir with the brake actuator to supply compressed air from said respective reservoirs to said motor and actuator to apply the tractor and trailer brakes, said last named means including a relay emergency valve on the trailer having a service connection with the motor, means to conduct compressed air from said motor to said compressor inlet to release the tractor brakes, and means including a check valve on the trailer for conducting compressed air from said actuator to said service connection and from the latter to said motor and compressor inlet to release the trailer brakes when the tractor brakes are released.

References Cited in the file of this patent
UNITED STATES PATENTS

| | | |
|---|---|---|
| 587,911 | Ashley | Aug. 10, 1897 |
| 2,133,275 | Andres et al. | Oct. 18, 1938 |
| 2,411,406 | Affleck | Nov. 19, 1946 |
| 2,451,139 | Williams et al. | Oct. 12, 1948 |
| 2,656,014 | Fites | Oct. 20, 1953 |
| 2,746,255 | Fitch | May 22, 1956 |